(12) United States Patent
Holbrook et al.

(10) Patent No.: US 9,817,594 B2
(45) Date of Patent: Nov. 14, 2017

(54) SYSTEM AND METHOD FOR BROADCASTING DATA TO MULTIPLE HARDWARE FORWARDING ENGINES

(71) Applicant: Arista Networks, Inc., Santa Clara, CA (US)

(72) Inventors: Hugh W. Holbrook, Palo Alto, CA (US); Sriram Sellappa, Santa Clara, CA (US); Neal Thomas Nuckolls, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/285,461

(22) Filed: Oct. 4, 2016

(65) Prior Publication Data

US 2017/0024154 A1    Jan. 26, 2017

Related U.S. Application Data

(63) Continuation of application No. 14/270,043, filed on May 5, 2014, now Pat. No. 9,479,425.

(Continued)

(51) Int. Cl.
    *G06F 3/06*      (2006.01)
    *H04L 12/761*    (2013.01)
    (Continued)

(52) U.S. Cl.
    CPC ............ *G06F 3/0619* (2013.01); *G06F 3/065* (2013.01); *G06F 3/067* (2013.01);
    (Continued)

(58) Field of Classification Search
    None
    See application file for complete search history.

(56) References Cited

U.S. PATENT DOCUMENTS 6,941,487 B1 * 9/2005 Balakrishnan ........ H04W 24/04
                                                      370/216
7,286,532 B1   10/2007 Rachepalli et al.
(Continued)

OTHER PUBLICATIONS

Bhoedjang, Raoul A. F. et al., "User-Level Network Interface Protocols", vol. 31, No. 11, Nov. 1998, pp. 53-60. XP-000824426, ISSN: 0018-9162, 001.

(Continued)

*Primary Examiner* — Andrew Lai
*Assistant Examiner* — Jamaal Henson
(74) *Attorney, Agent, or Firm* — Blakely Sokoloff Taylor & Zafman LLP

(57) ABSTRACT

A method and apparatus of a device that broadcasts data to multiple hardware forwarding engines is described. In an exemplary embodiment, a central processing unit of the device receives the data to broadcast to the plurality of hardware forwarding engines. The device further writes the data to a broadcast log. In addition, the device transmits a signal to one or more co-processors that the data is available to be read, wherein each of the plurality of hardware forwarding corresponds to one of the one or more co-processors. Each of these co-processors reads the data in the broadcast log by receiving the signal that the data is ready to be read from the broadcast log. In addition, each co-processor determines a broadcast log entry for the data for that co-processor. Each co-processor further reads the data from the broadcast log entry via a direct memory access in memory that stores the broadcast log and the plurality of hardware forwarding engines use the data to process network traffic.

16 Claims, 11 Drawing Sheets

Related U.S. Application Data

(60) Provisional application No. 61/822,259, filed on May 10, 2013.

(51) Int. Cl.

|  |  |
|---|---|
| *G06F 12/1081* | (2016.01) |
| *G06F 13/28* | (2006.01) |
| *H04L 12/931* | (2013.01) |
| *G06F 13/40* | (2006.01) |
| *H04L 12/18* | (2006.01) |
| *H04L 12/935* | (2013.01) |

(52) U.S. Cl.
CPC .......... *G06F 12/1081* (2013.01); *G06F 13/28* (2013.01); *G06F 13/4022* (2013.01); *H04L 12/18* (2013.01); *H04L 45/16* (2013.01); *H04L 49/00* (2013.01); *H04L 49/309* (2013.01)

(56) References Cited

U.S. PATENT DOCUMENTS

| | | | | |
|---|---|---|---|---|
| 7,620,040 B2* | 11/2009 | Bhaskaran | ............ | H04L 49/552 370/389 |
| 7,660,259 B1* | 2/2010 | Grosser | ................... | H04L 45/00 370/252 |
| 2003/0137980 A1* | 7/2003 | Jung | ...................... | H04L 45/00 370/392 |
| 2010/0158018 A1 | 6/2010 | Lee | | |
| 2014/0086255 A1 | 3/2014 | Gooch | | |

OTHER PUBLICATIONS

"Arista 7500 Switch Architecture ('A day in the life of a packet')" May 9, 2013 (May 9, 2013). XP055137885. Retrieved from the Internet: URL: http://www.nvc.co.jp/pdf/product/arista/Arista_7500E_Switch_Architecture.pdf, pp. 1-17.

Srivastava, Sameer, "Redundancy Management for Network Devices", Infosys Technologies Ltd., India, The 9th Asia-Pacific Conference on Sep. 21-24, 2003, IEEE vol. 3, Sep. 21, 2003, pp. 1157-1162. XP010687985, ISBN: 978-0-7803-8114-8.

EP Search Report and Written Opinion for Appln No. EP 14 16 7802 dated Sep. 10, 2014. (11 pages).

\* cited by examiner

SYSTEM AND METHOD FOR BROADCASTING DATA TO MULTIPLE HARDWARE FORWARDING ENGINES

RELATED APPLICATIONS

This application claims the benefit of prior, co-pending non-provisional application Ser. No. 14/270,043, filed May 2, 2014; which claims the benefit of priority of U.S. Provisional Patent Application No. 61/822,259, filed May 10, 2013, the entirety of which is incorporated by reference.

FIELD OF INVENTION

This invention relates generally to data networking and more particularly relates to broadcasting data from a central processing unit to multiple hardware forwarding engines.

BACKGROUND OF THE INVENTION

A network element can include two different planes that are used to process network traffic, a data plane and a control plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane gathers the configuration data from different sources (e.g., locally stored configuration data, via a command line interface, or other management channel such as Simple Network Management Protocol (SNMP) and configures the data plane using the configuration data.

The control plane includes a central processing unit (CPU) that will write configuration data to the data plane. For each write, the CPU retrieves the data from memory (e.g., Dynamic Random Access Memory (DRAM) memory that is part of the control plane), sends this data to across a bus (such as a Peripheral Components Interconnect (PCI) bus), and waits for confirmation that the data is stored in the data plane. This can, however, be a slow process because the CPU needs to wait for confirmation that the data is stored in the data plane and the travel across the bus between the control and data plane can be slow. Thus, the overall process of writing data to the data plane can be a slow process. This is compounded if there are multiple hardware forwarding engines that each uses the same copy of the configuration data. For example, updating a network element with 48 hardware forwarding engines by the CPU can take a relatively long time, especially for configuration data that can be quickly changing or large, such as routing or media access control (MAC) tables.

SUMMARY OF THE DESCRIPTION

A method and apparatus of a device that broadcasts data to multiple hardware forwarding engines is described. In an exemplary embodiment, a central processing unit of the device receives the data to broadcast to the plurality of hardware forwarding engines. The device further writes the data to a broadcast log. In addition, the device transmits a signal to one or more co-processors that the data is available to be read, where each of the plurality of hardware forwarding engines corresponds to one of the one or more co-processors. Each of these co-processors read the data in the broadcast log by receiving the signal that the data is ready to be read from the broadcast log. In addition, each co-processor determines a broadcast log entry for the data for that co-processor. Each co-processor further reads the data from the broadcast log entry via a direct memory access in memory that stores the broadcast log and the plurality of hardware forwarding engines use the data to process network traffic.

In another embodiment, the device reads data broadcasted from a control plane to a plurality of hardware forwarding engines of a network element. A plurality of co-processors receives a signal that indicates that the data is ready to be read from the broadcast log, where each of the co-processors corresponds to one of the hardware forwarding engines. Each of the co-processors determines a broadcast log entry for the data for the co-processor. In addition, each co-processors reads the data from the broadcast log entry via a direct memory access in memory that stores the broadcast log, where the plurality of hardware forwarding engines use the data to process network traffic and a central processing unit broadcasts the data to the broadcast log.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
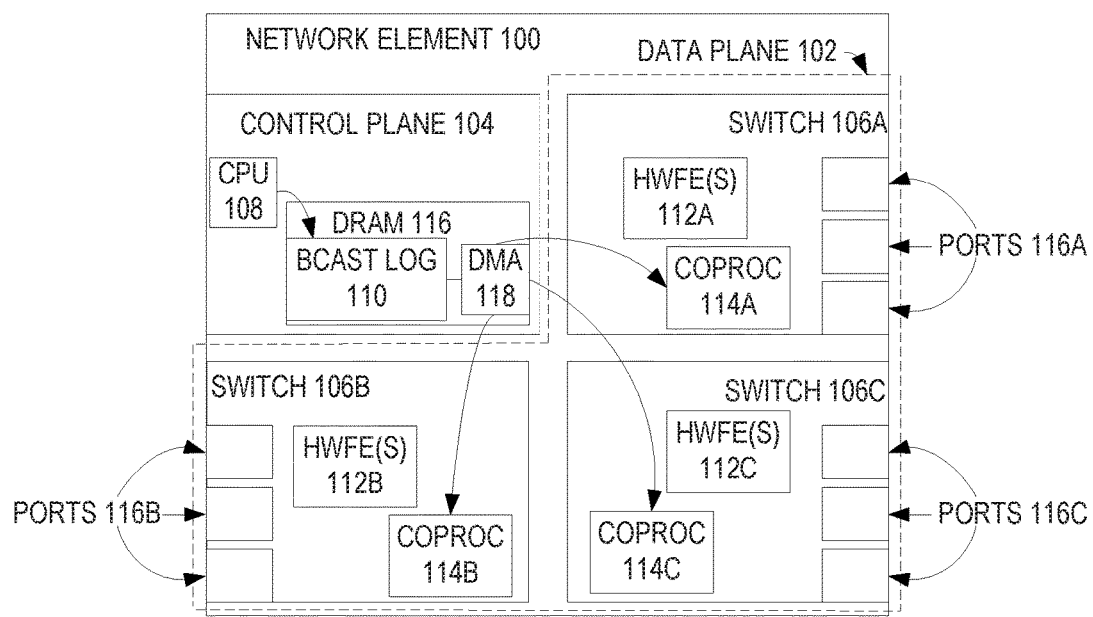
FIG. 1 is a block diagram of one embodiment of a network element that includes a central processing unit reading and/or writing data to a broadcast log that is accessed by a plurality of co-processors for a plurality of hardware forwarding engines.

A method and apparatus of a device that broadcasts data to multiple hardware forwarding engines is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that broadcasts data to multiple hardware forwarding engines is described. In one embodiment, a central processing unit (CPU) sends configuration data to multiple hardware forwarding engines using a broadcast log. The broadcast log is a log that is used to store data for transfer between the CPU and the co-processors. Because the broadcast log is stored in memory (e.g., dynamic random access memory (DRAM), static random access memory (SRAM), flash memory, graphics memory, or another type of memory), the co-processors can directly access the log using a DMA controller. For transfer of data from the control plane to the hardware forwarding engines, the CPU writes data into the broadcast log for each hardware forwarding engine. In addition, the CPU signals each co-processor that corresponds to each of the hardware forwarding engines that there is data in the broadcast log that is available to be read. The co-processors can directly access this data in the broadcast log using a DMA controller that is coupled to the DRAM that stores the broadcast log. In one embodiment, the data stored in the broadcast log can include a hardware forwarding engine identifier, a key value pair of data, and/or a co-processor identifier. In another embodiment, the co-processor can transfer data from the hardware forwarding engine to the CPU. In this embodiment, the co-processor receives data from a hardware forwarding engine, and writes the data to the broadcast log using the DMA controller. The co-processor signals the CPU that this data is available in the broadcast log and the CPU reads this data. In one embodiment, the DMA controller can read and/or write to the memory that stores that the broadcast log. This DMA controller may reside in the coprocessor or may be a separate component within the switch that the coprocessor can use or otherwise control to read or write the DRAM that stores the broadcast log. In one embodiment, there is one or more DMA controllers per coprocessor, and the DMA controller resides in the data plane.

FIG. 1 is a block diagram of one embodiment of a network element 100 that includes central processing unit reading and/or writing data to a broadcast log that is accessed by a plurality of co-processors for a plurality of hardware forwarding engines. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface.

The data plane 102 includes multiple switches 106A-C that can each receive, process, and/or forward network traffic. In one embodiment, the complex of one coprocessor and the associated forwarding engine(s) is one "switch" for the purposes of this invention. There may be multiple switches on a linecard, or just one. The switches may all be connected to the CPU using one PCI bus or multiple PCI buses, or some other shared bus used to access the DRAM in the switch. In this embodiment, the same design applies even if there are no linecards and even if there is a single coprocessor and forwarding engine. In a fixed system with no linecards, it is possible that there is still a coprocessor that does this. In another embodiment, the coprocessor associated with a switch may reside in the main CPU and be a separate thread of the same CPU or of another CPU in the system that is associated with one or more hardware forwarding engines, but reading from the broadcast log. In a further embodiment, the coprocessor need not reside on the same linecard as the hardware forwarding engine. In this embodiment, the coprocessor has access to main memory (e.g., DMA controller) and that the coprocessor has the ability to write to (and possibly read from) the associated hardware forwarding engines. The coprocessor can reside on a different linecard, or it could be dedicated coprocessor hardware on the main supervisor/controller card, or a thread of the main CPU. In another embodiment, the coprocessor may reside physically inside the hardware forwarding engine, and be a component of that hardware forwarding engine.

In one embodiment, each switch 106A-C includes one or more hardware forwarding engines 112A-C, co-processor 114A-C, and ports 116A-C, respectively. In one embodiment, the hardware forwarding engines 112A-C is a component that forwards data for the network element (e.g., routing, switching, or another type of network forwarding). In one embodiment, the co-processor 114A-C is a processor for each switch 106A-C that can be used to accelerate various functions of the switch 114A-C. For example and in one embodiment, the co-processors 114A-C can read and write from broadcast log in the control plane 104 to program the corresponding hardware forwarding engines 112A-C and to push data from the hardware forwarding engines 112A-C to the CPU 108 via the broadcast log 110. In one embodiment, there is one co-processor 114A-C for one or more hardware forwarding engines 112A-C. For example and in one embodiment, there is one co-processor 114A for three hardware forwarding engines 112A. Reading and writing with the broadcast log is further described in FIGS. 3-6 below. In one embodiment, the ports 116A-C are used to receive and transmit network traffic. The ports 116A-C can be the same or different physical media (e.g., copper, optical, wireless and/or another physical media). In alternative embodiment, one coprocessor can control multiple hardware forwarding engines (not illustrated). In a further embodiment, the hardware forwarding engines could be implemented in software or a combination of software and hardware. For example and in one embodiment, the hardware forwarding engine could be doing the forwarding in software in some sort of programmable processor or network processor on the linecard, where the tables, memories, or data structures that are used by that forwarding engine are written to by the coprocessor.

In one embodiment, the control plane 104 gathers the configuration data for the hardware forwarding engines 112A-C from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C using the broadcast log 110. In one embodiment, the control plane 104 includes central processing unit (CPU) 108 and DRAM 116. In this embodiment, the CPU 108 is used to process information for the control plane 104. In particular, the CPU 108 writes configuration data for the hardware forwarding engines 112A-C and reads data from the hardware forwarding engines 112A-C using the broadcast log 110.

In one embodiment, the DRAM 116 is memory that is used to stored data for the control plane. In addition, the DRAM 116 is shared with the data plane 102, because the co-processors 114A-C of the data plane 102 can access the contents of this memory. In one embodiment, the DRAM 116 includes the broadcast log 110 and a direct memory access (DMA) controller 118. Alternatively, the DMA controller 118 is not part of the DRAM 116, is part of the switch 106A-C, and is coupled to the DRAM 116. In one embodiment, the broadcast log 110 is a log that enables the CPU 108 to broadcast data to the multiple co-processors 114A-B. In this embodiment, the CPU 108 writes an entry for each hardware forwarding engine 112A-C in the broadcast log 110. In one embodiment, each entry in the broadcast log can include a hardware forwarding engine identifier, the value, and a co-processor identifier. In one embodiment, the value is a key-value pair. The broadcast log 110 is further described in FIG. 2 below. The DMA controller 118 is a controller coupled to the memory in the DRAM 116 that allows the co-processors 114A-B to directly access the DRAM 116. In one embodiment, the DMA controller 116 allows the co-processors to directly access the broadcast log 110 without needing the CPU 108 to send the data to each co-processor 114A-B.

Figure 2:
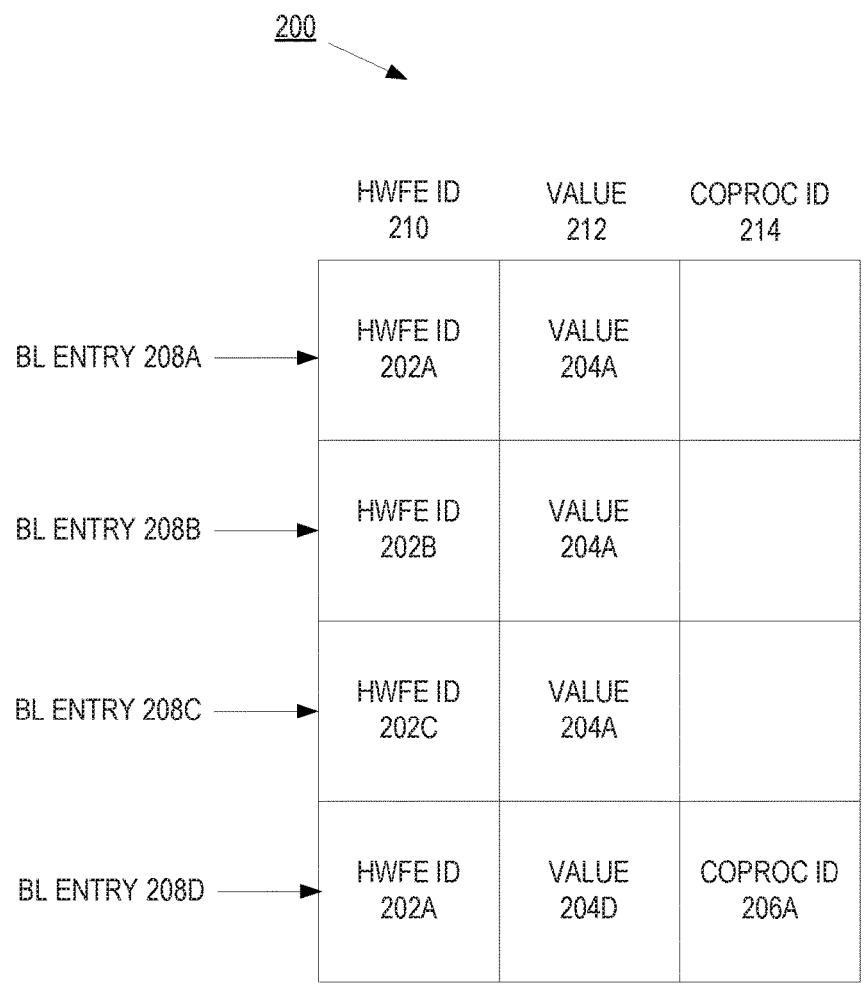
FIG. 2 is a block diagram of one embodiment of a broadcast log.

FIG. 2 is a block diagram of one embodiment of a broadcast log 200. As described above, the broadcast log 200 is a log that is used to store data for transfer between the CPU and the co-processors. Because the broadcast log is stored in DRAM, the co-processors and/or CPU can directly access the log using a DMA controller. In one embodiment, the broadcast log 110 can be an open ended log, an array, or another type of data structure for a log. In one embodiment, the broadcast log 110 includes multiple entries 208A-D, where each entry 208A-D can include a hardware forwarding engine identifier 210, the value 212, and a co-processor identifier 214. In one embodiment, for a CPU write to the broadcast log 200, each entry 208A-D includes a hardware forwarding engine identifier and a value. Alternatively, the hardware forwarding engine identifier is a bit vector as described below. In another embodiment, for a co-processor write to the broadcast log 200, each entry 208A-D includes a hardware forwarding engine identifier, a value, and a co-processor identifier. For example and in one embodiment, if the CPU writes the same value for three different hardware forwarding engines to entries 208A-C, entry 208A includes hardware forwarding engine identifier 202A and value 204A, entry 208B includes hardware forwarding engine identifier 202B and value 204A, and entry 208C includes hardware forwarding engine identifier 202C and value 204A. As another example and embodiment, if a co-processor writes a value from a hardware forwarding engine identifier for the CPU to entry 208D, the entry would include hardware forwarding engine identifier 202A (or bit vector), value 204D, and co-processor identifier 206A.

In alternative embodiment, each hardware forwarding engine is assigned a small numeric identifier (e.g. 1 to 64 if there are 64 hardware forwarding engines) and a log entry carries a 'target hwfe' bit vector to indicate which hardware forwarding engine should have the log entry applied to them. In this embodiment, the 'target hwfe' is of at least as many bits as there are possible HWFEs in the system. For example and in one embodiment, the $i^{th}$ bit position with bit set to 1 indicates that the corresponding entry should be applied to the $i^{th}$ hardware forwarding engine by the controlling co-processor. Alternatively, if the $i^{th}$ bit is 0 then coprocessor controlling the $i^{th}$ hardware forwarding engine ignores the corresponding entry.

To use a bit vector, a coprocessor will learn which hardware forwarding engine(s) the coprocessor is responsible for and which bits of the bit vector into the HWFEs that the coprocessor controls. In one embodiment, this is done by writing that information into the control memory of the coprocessor. Alternative possibilities exist to associate the coprocessor to one or more hardware forwarding engines (e.g., the coprocessor automatically discovering that information by reading from the hardware forwarding engines, identifying its physical location in the system (linecard and chip position) using, for instance hardware strapping pins, etc.).

In this embodiment, the bit vector is one compact way to represent the set of hardware forwarding engines targeted by a log entry. In one embodiment, the bit vector is of fixed length because the maximum number of for the network element is fixed. Alternatively, there can be other ways to represent a set of identifiers (e.g., a list of identifiers, variable length bit vector, or some other way to represent a set of identifiers).

Figure 3:
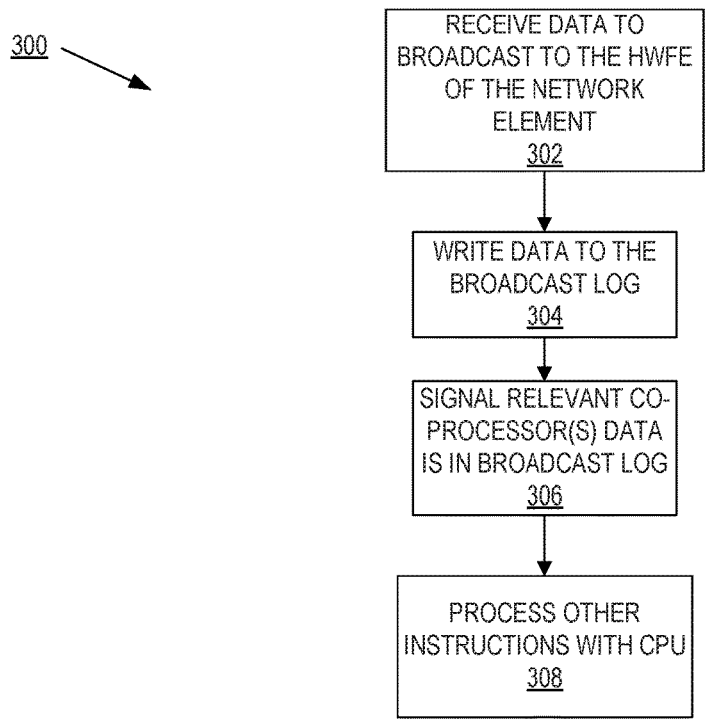
FIG. 3 is a flow diagram of one embodiment of a process to broadcast data from a central processing unit (CPU) to a plurality of hardware forwarding engines.

FIG. 3 is a flow diagram of one embodiment of a process 300 to broadcast data from a CPU to a plurality of hardware forwarding engines. In one embodiment, process 300 is performed by a CPU to broadcast data to a plurality of hardware forwarding engines, such as CPU 108 of FIG. 1 above. In FIG. 3, process 300 begins by receiving data that is to be broadcast to the plurality of hardware forwarding engines of the network element in block 302. In one embodiment, the data to be broadcasted is configuration data that is used to configure each of the plurality of hardware forwarding engines. In one embodiment, the data broadcasted is the same data for each of the plurality of hardware forwarding engines. For example and in one embodiment, this data can be routing table entries or media access control (MAC) table entries. At block 304, process 300 writes the data to the broadcast log. In one embodiment, process 300 creates an entry for each target hardware forwarding engine and writes the appropriate information in each entry. For example and in one embodiment, if process 300 is to broadcast data to three different hardware forwarding engines, process 300 creates an entry for each of the three hardware forwarding engines, where each entry includes the corresponding hardware forwarding engine identifier and the data.

At block 306, process 300 signals the relevant co-processor that data is in the broadcast log ready for retrieval. In one embodiment, process 300 signals the relevant co-processor by writing to a register or memory address inside the coprocessor to indicate that there is more data in the broadcast log that the co-processor should go get. In addition or in an alternative embodiment, the main CPU can write to an interrupt or "mailbox" or "doorbell" register to wake or otherwise interrupt the co-processor and cause the co-processor to go look in the broadcast log. The signal could also indicate in some way (a pointer or sequence number) of the address in the memory of the broadcast log. Process 300 may also indicate the address of the last entry in the broadcast log (if it is represented as an array) or the end may be implied in the data structure of the broadcast log itself (if it is a linked list, for instance, the coprocessor discovers the end of the broadcast log when it reaches the end of a linked list). In one embodiment, after signaling the co-processor, the CPU is available to process other instructions. This is because, since the CPU is writing to DRAM, the CPU does not need wait to verify that the data is stored in the DRAM. In one embodiment, by having the co-processors directly read the data in the broadcast log instead of the CPU writing the data to the co-processor, the process of moving the data from the CPU to the hardware forwarding engines can be greatly sped up. For example and in one embodiment, the speed up in this process can be up to is a thousand-fold, where a transfer of a routing table that took minutes would now take seconds.

Figure 4:
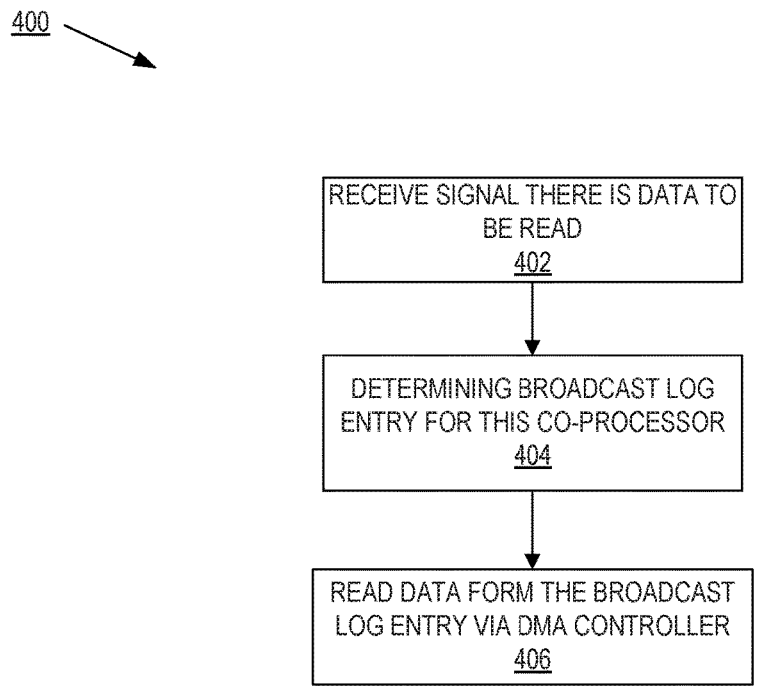
FIG. 4 is a flow diagram of one embodiment of a process to retrieve broadcasted data from a broadcast log.

FIG. 4 is a flow diagram of one embodiment of a process 400 to retrieve broadcasted data from a broadcast log. In one embodiment, process 400 is performed by a co-processor to read data that is broadcasted to a plurality of hardware forwarding engines, such as one of the co-processors 114A-C of FIG. 1 above. In FIG. 4, process 400 begins by receiving a signal that there is data to be read from the broadcast log at block 402. In one embodiment, the signal would include a reference to either the next available entry in the broadcast log or to the total count of available entries, with an indication of the location in memory. In another embodiment, the signal indicates that there is more to read and the coprocessor is responsible for remembering a pointer to where the next data will show up. In this embodiment, this signal is possible if the broadcast log is stored in a circular array, for example. At block 404, process 400 determines a broadcast entry log for this co-processor. In one embodiment, the signal includes a reference to the entry in the broadcast log (e.g., an index, a pointer, or some other references to a broadcast entry). In one embodiment, the signal includes references to more than one entry. In another embodiment, the broadcast log can be content addressable memory and, upon receiving the signal, process 400 searches the content addressable memory for a broadcast log entry that includes the co-processor identifier or a co-processor identifier mask that encompasses the co-processor identifier. In this embodiment, process 400 searches the content addressable memory with the co-processor identifier and the content addressable memory returns one or more entries that have the co-processor identifier. At block 406, process 400 reads the data from the one or more broadcast log entries via the DMA controller. In one embodiment, by accessing the memory directly with the DMA controller, the retrieval of the data in the broadcast log is faster because the DMA controller allows direct access to the broadcast log, without the need for the CPU to be involved, and the DMA controller is optimized for bulk reads of data. In one embodiment, by having the co-processors directly read the data in the broadcast log instead of the CPU writing the data to the co-processor, the process of moving the data from the CPU to the hardware forwarding engines can be greatly sped up. For example and in one embodiment, the speed up in this process can be up to is a thousand-fold, where a transfer of a routing table that took minutes would now take seconds. This data that is read can then be used by the co-processor to configure the corresponding hardware forwarding engine. In this example and embodiment, the optimization allows for the coprocessor to use the associated DMA controller to read multiple entries at once from memory into the local memory of the co-processor. This allows the use of bulk transfer that can be substantially faster.

In one embodiment, each co-processor maintains, either in its local memory or in main memory (e.g., DRAM 116), a sequence number (or other indicator like a pointer) to indicate to the main CPU how much of the broadcast log it has processed. In this embodiment, once all coprocessors have processed to at least broadcast log entry N, the associated memory for broadcast log entries smaller than N can be reclaimed and freed or reused. By freeing up the memory for the broadcast log entries, the broadcast log will not continually grow because the network element would not know when a coprocessor is done using parts of the broadcast log.

In another embodiment, if a hardware forwarding engine (and/or coprocessor) is removed from the system (e.g., by linecard removal or component failure) there is a way for the main CPU to know that the corresponding hardware is no longer there and to not wait for it for any subsequent entries, so that it can free the associated memory. In one embodiment, a heartbeat or liveness check indicates that the coprocessor is still there. The CPU considers as "complete" all outstanding writes, and stops waiting for any outstanding reads. In this embodiment, a coprocessor and its associated hardware forwarding engines are determined to no longer be present, based on the liveness check. In addition, the network element may also take action based on an interrupt or error that is delivered to the CPU by hardware within the "switch" when attempting to access memory on the linecard or in the coprocessor that is no longer accessible when the linecard is removed or the coprocessor or hardware forwarding engine fails.

In one embodiment, the network element can handle a hot insertion of a hardware forwarding engine and/or co-processor. In this embodiment, the broadcast log is an ongoing sequence of updates to the plurality of hardware forwarding engines. In one embodiment, each of the hardware forwarding engines are identical or substantially similar that have tables that are either identical or that can be programmed by passing them all the same sequence of broadcast log entries. For example and in one embodiment, the updates stored in the broadcast log may be a sequence of register writes or a sequence of routing table or hardware MAC table insertions.

In one embodiment, a problem is that the network element has been up for 10 weeks and 1,000,000 different writes have already happened. In this embodiment, the 1,000,000 updates have been seen, processed by the existing coprocessors, and updates 1-1,000,000 no longer exist in the broadcast log because the updates in the broadcast log has been reclaimed as the updates have all been used. However, a new hardware forwarding engine (and possibly a new coprocessor) is added into the system and start using the broadcast log. In one embodiment, to insert the new hardware forwarding engine and bring this new engine up to date with the other hardware forwarding engines, the network element may need to replay a sequence of updates to the new hardware forwarding engine that will get new hardware forwarding engine to the same state as if it had been there all along, and had seen the log updates 1-1,000,000. It would be helpful to bring the new hardware forwarding engine up to date without actually storing or playing back all prior 1,000,000 updates. Storing the past updates would use too much memory and playing them all back is too slow so a better approach is useful.

In one embodiment, the approach used is to record the writes in the broadcast log into a hardware shadow for each "class" of hardware forwarding engines. In this embodiment, the shadow represents the summarized state that a hardware forwarding engine would be in after applying all previous broadcast log entries. In one embodiment, a "class" of hardware forwarding engine would be a set of hardware forwarding engines that can all be managed by the same sequence of operations in the broadcast log. These might be different instances of the same hardware engine, wherein either some or all tables within that hardware engine are identically programmed.

For example and in one embodiment, if the broadcast log is a sequence of hardware writes to the hardware forwarding engine represented as (address, value) pairs then the associated "hardware shadow" is simply a record of <address, value> pairs that records the latest value for every address that has ever been written. In this example, when a new instance of this "class" of hardware forwarding engine comes online, the corresponding hardware shadow is written back to that hardware forwarding engine either by invoking a DMA sequence unrelated to the broadcast log, or by putting those writes into the shared broadcast log and targeted to that hardware forwarding engine. Once the initial synchronization has complete that captures the writes to the hardware shadow through broadcast log entry N, the corresponding co-processor can be directed (using mechanisms described already in the description) to start reading from the broadcast log at entry N. In another embodiment, the DMA sequence containing the writes used to replay the hardware shadow is presented to the coprocessor in the same format used for the shared broadcast log. In this embodiment, a special instruction appears at the end of this first broadcast log indicating to the coprocessor that it should start processing log entries in the shared broadcast log, starting from log entry N.

In one embodiment, the advantage of this approach relative to using a hardware shadow is that multiple identical or sufficiently-alike hardware forwarding engines in the same "class" can be managed with a single shadow and a single log, and thus much more efficiently which results in faster update times and uses less memory.

Figure 5:
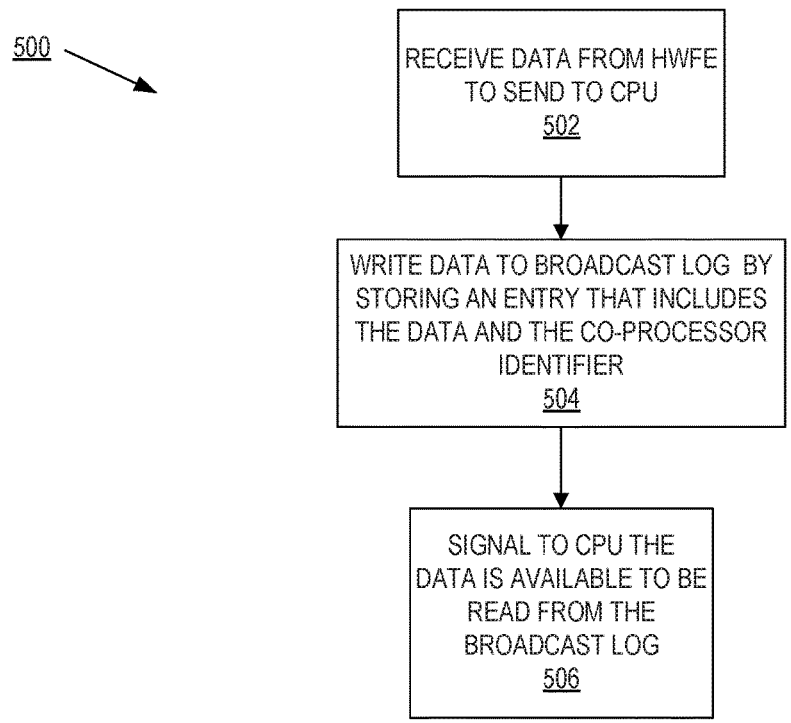
FIG. 5 is a flow diagram of one embodiment of a process for a CPU to read data from a broadcast log.

As described above, the CPU can write data to the broadcast log that is read by the co-processor. In another embodiment, the co-processor can write data to the broadcast log. In one embodiment, the co-processor writes this data so as to communicate data gathered by the hardware forwarding engines to the control plane (e.g., counter data, statistics regarding the network traffic processed, alarms, dynamic state data, or other data gathered or generated by the hardware forwarding engine). FIG. 5 is a flow diagram of one embodiment of a process 500 to write data to the broadcast log by a co-processor. In one embodiment, process 500 is performed by a co-processor to read data that is broadcasted to a plurality of hardware forwarding engines, such as one of the co-processors 114A-C of FIG. 1 above. In FIG. 5, process 500 begins by receiving data from a hardware forwarding engine to send to the CPU at block 502. In one embodiment, this data is data gathered by the hardware forwarding engines to be communicated to the control plane (e.g., counter data, statistics regarding the network traffic processed, alarms, or other data gathered or generated by the hardware forwarding engine). For example and in one embodiment, this data can be counters, activity bits, or MAC table entries. At block 504, process 500 writes the data to the broadcast log. In one embodiment, process 500 writes the hardware forwarding engine identifier, corresponding value, and co-processor identifier to a broadcast log entry. The broadcast log entry can be the next available entry in the broadcast log or can be a fixed entry. At block 506, process 500 signals the CPU that the data is available to be read from the broadcast log. In one embodiment, process 500 sends a signal by writing an entry reference or co-processor identifier to the memory of the CPU.

In one embodiment, a detail to address is where does the coprocessor write the data into main memory. For example and in one embodiment, having all of the coprocessors write to the broadcast log and use the next entry is possible but would require a synchronization between coprocessors to ensure that two coprocessors do not write to the same memory location. Instead, the following embodiments can be used without requiring synchronization or coordination with locks, or atomic writes by the coprocessors. In one embodiment, the broadcast entry points to an address in main memory, and the coprocessor writes to that address plus some multiple of its hardware forwarding engine identifier. In this embodiment, writing to different memory locations prevents two coprocessors from trying to write to the same memory. The offset associated with the hardware forwarding identifier can be the one assigned to hardware forwarding identifier, or can be implied in the request based on the number of bits set in the target hardware forwarding engine bit vector. For example and in one embodiment, a compact implementation is that if a broadcast request with a "target HWFE vector" has three hardware forwarding engines as the targets (10, 11, and 17) then each hardware forwarding engine would write to <base address> plus <multiple> times <offset> where HWFE10 would use offset 0, HWFE1 would write to offset 11, and HWFE17 would write to offset 2. The base address and multiple could be implied by the type of the broadcast entry or explicitly encoded in fields of the broadcast entry.

In one embodiment, the result data is inline in the log and the main CPU that is generating the broadcast request would reserve room immediately following it in the log corresponding to the size of the result times the number of targeted hardware forwarding engines. In another embodiment, there is a separate region of memory per hardware forwarding engine where the associated coprocessor can place "return value" from broadcast log entries that indicate that something should be read from the hardware forwarding engine.

Figure 6:
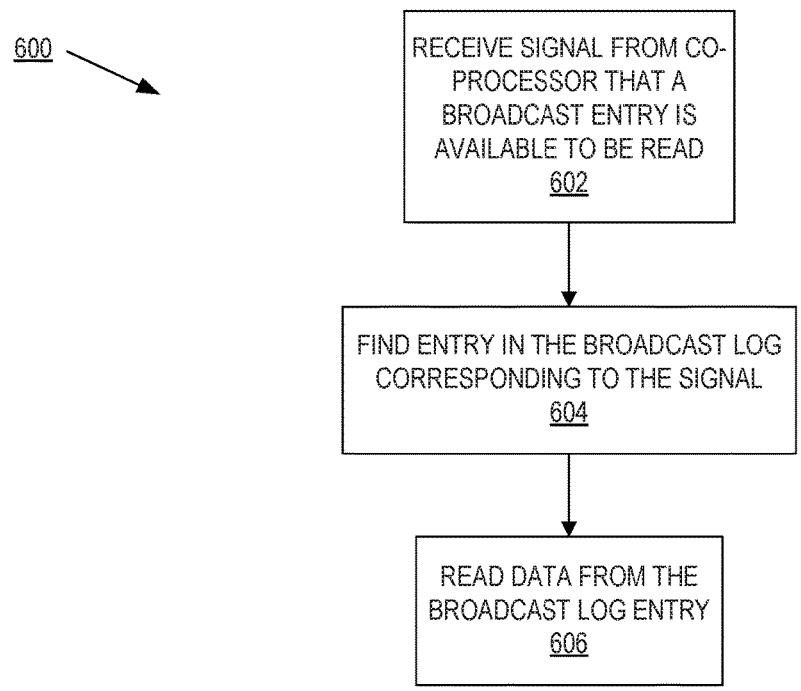
FIG. 6 is a flow diagram of one embodiment of a process to write data to the broadcast log by a co-processor.

In another embodiment, the CPU can read data from the broadcast log that is put there by a co-processor. FIG. 6 is a flow diagram of one embodiment of a process 600 for a CPU to read data from a broadcast log. In one embodiment, process 600 is performed by a CPU to broadcast data to a plurality of hardware forwarding engines, such as CPU 108 of FIG. 1 above. In FIG. 6, process 600 begins by receiving a signal from a co-processor that a broadcast log entry is available to be read at block 602. In one embodiment, the co-processor sends the signal to process 600 by writing the signal into the memory of the CPU. At block 604, process 600 finds the entry in the broadcast log corresponding the signal. In one embodiment, the signal includes a reference to the entry in the broadcast log (e.g., an index, a pointer, sequence number, or some other references to a broadcast entry). In one embodiment, the signal includes references to more than one entry. In another embodiment, the broadcast log can be content addressable memory and, upon receiving the signal, process 600 searches the content addressable memory for a broadcast log entry that includes the co-processor identifier or a co-processor identifier mask that encompasses the co-processor identifier. In this embodiment, the signal includes a co-processor identifier that can be used to search the content addressable memory. Process 600 reads the data from the one or more broadcast log entries at block 606. In one embodiment, process 600 reads the data, which includes the hardware forwarding engine identifier and the value associated with that entry. In one embodiment, the values in the broadcast log can be counter or statistics data that is being pushed over from the hardware forwarding engines to the control plane. In another embodiment, the values in the broadcast log can be dynamic state data (e.g., newly discovered routes or MAC addresses) that is to be propagated to other hardware forwarding engines via the CPU.

Figure 7A:
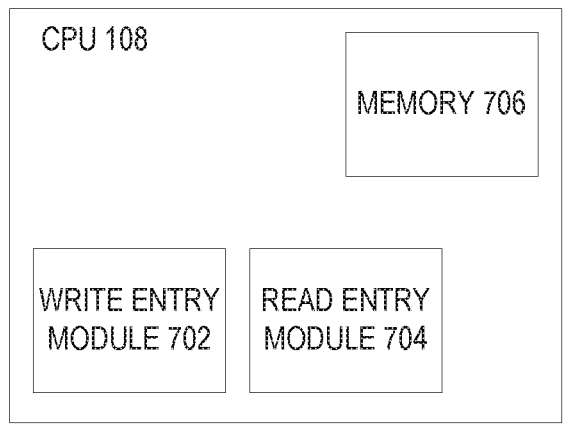
FIG. 7A is a block diagram of a CPU that includes a write entry module and a read entry module.

FIG. 7A is a block diagram of a CPU 108 that includes a write entry module 702 and a read entry module 704. In one embodiment, the CPU 108 includes the write entry module 702, read entry module 704, and memory 706. In one embodiment, the write entry module 702 writes an entry to the broadcast log as described in FIG. 3 above. The read entry module 704 reads an entry from the broadcast log as described in FIG. 6 above. The memory 706 stores a signal from a co-processor.

Figure 7B:
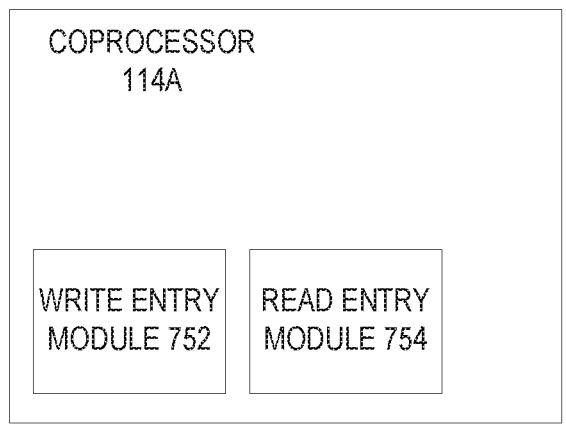
FIG. 7B is a block diagram of a co-processor that includes a write entry module and a read entry module.

FIG. 7B is a block diagram of a co-processor 114A that includes a write entry module 752 and a read entry module 754. In one embodiment, the write entry module 752 writes an entry to the broadcast log as described in FIG. 5 above. The read entry module 754 reads an entry from the broadcast log as described in FIG. 4 above.

Figure 8A:
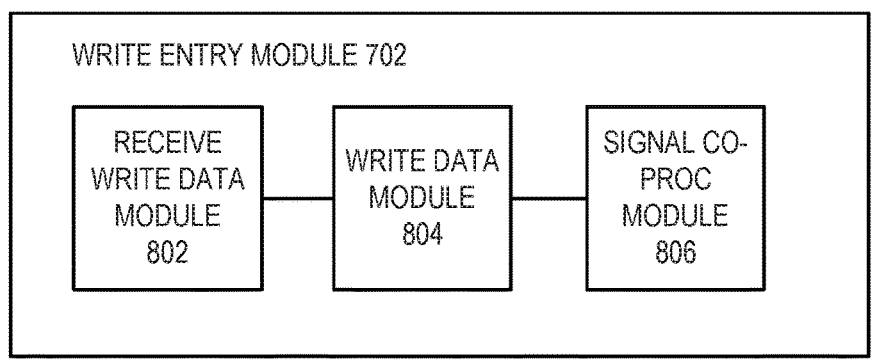
FIG. 8A is a block diagram of a CPU write entry module that writes data to a broadcast log.

FIG. 8A is a block diagram of a CPU write entry module 702 that writes data to a broadcast log. In one embodiment, the CPU write entry module 702 includes a receive write data module 802, write data module 804, and signal co-processor module 806. In one embodiment, the receive write data module 802 receives the data to be written to the broadcast log as described in FIG. 3 at block 302 above. The write data module 804 writes the data to the broadcast log as described in FIG. 3 at block 304 above. The signal co-processor module 806 signals the co-processor that there is data available to be read as described in FIG. 3 at block 306 above.

Figure 8B:
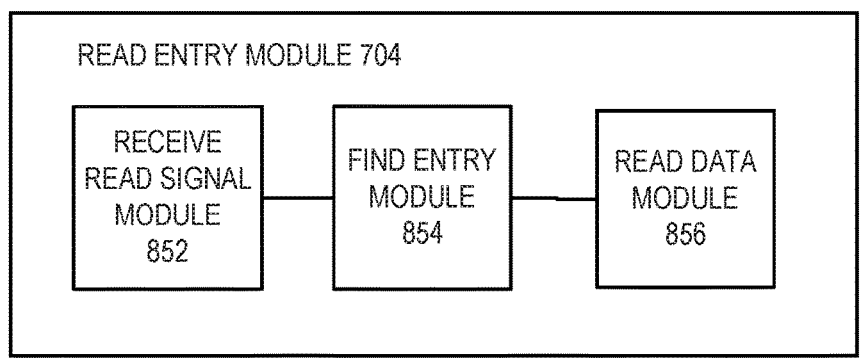
FIG. 8B is a block diagram of a CPU read entry module that reads data to a broadcast log.

FIG. 8B is a block diagram of a CPU read entry module 704 that reads data to a broadcast log. In one embodiment, the CPU read entry module 704 includes receive read signal module 852, find entry module 854, and read data module 856. In one embodiment, the receive read signal module 852 receives a signal that data is available in the broadcast log for reading as described in FIG. 6 at block 602 above. The find entry module 854 determines the broadcast log entry as described in FIG. 6 at block 604 above. The read data module 856 reads the data from the broadcast log as described in FIG. 6 at block 606 above.

Figure 9A:
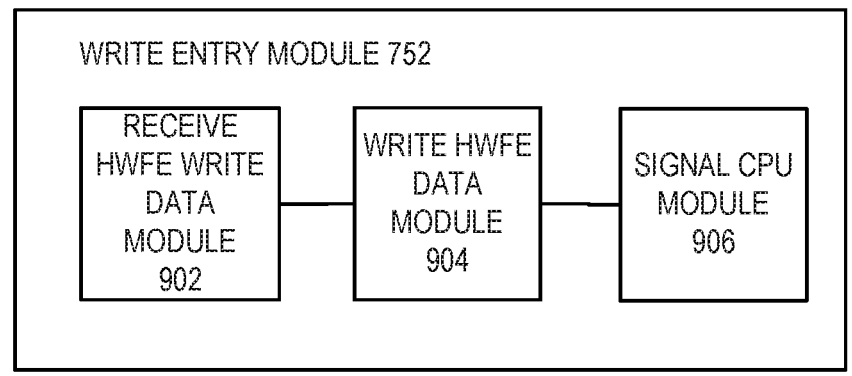
FIG. 9A is a block diagram of a co-processor write entry module that writes data to a broadcast log.

FIG. 9A is a block diagram of a co-processor write entry module 752 that writes data to a broadcast log. In one embodiment, the co-processor write entry module 752 includes a receive hardware forwarding engine data module 902, a write hardware forwarding engine data module 904, and a signal CPU module 906. In one embodiment, the receive hardware forwarding engine data module 902 receives the data to write to the broadcast log as described above in FIG. 5 at block 502 above. The write hardware forwarding engine data module 904 writes the data to the broadcast log as described above in FIG. 5 at block 504 above. The signal CPU module 906 signals the CPU that the data is available in the broadcast log to be read as described above in FIG. 5 at block 506 above.

Figure 9B:
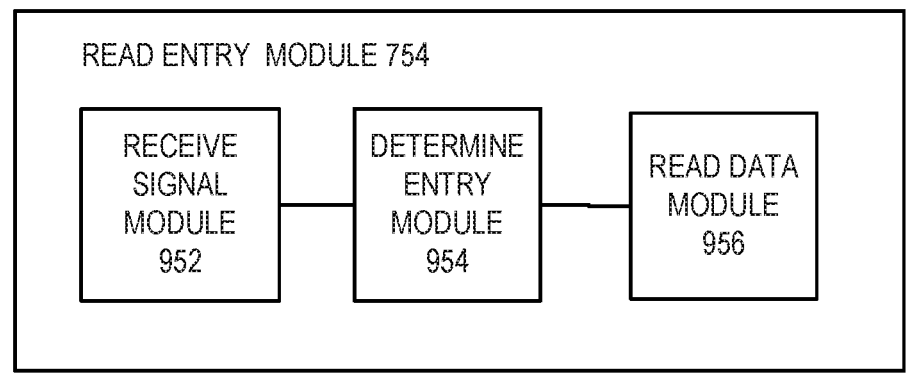
FIG. 9B is a block diagram of a co-processor read entry module that reads data to a broadcast log.

FIG. 9B is a block diagram of a co-processor read entry module 754 that reads data from a broadcast log. In one embodiment, the co-processor read entry module 754 includes a receive signal module 952, determine entry module 954, and read data module 956. In one embodiment, the receive signal module 952 receives a signal as described above in FIG. 4 at block 402 above. The determine entry module 954 determines the broadcast log entry as described above in FIG. 4 at block 404 above. The read data module 956 reads the data from the entry as described above in FIG. 4 at block 406 above.

Figure 10:
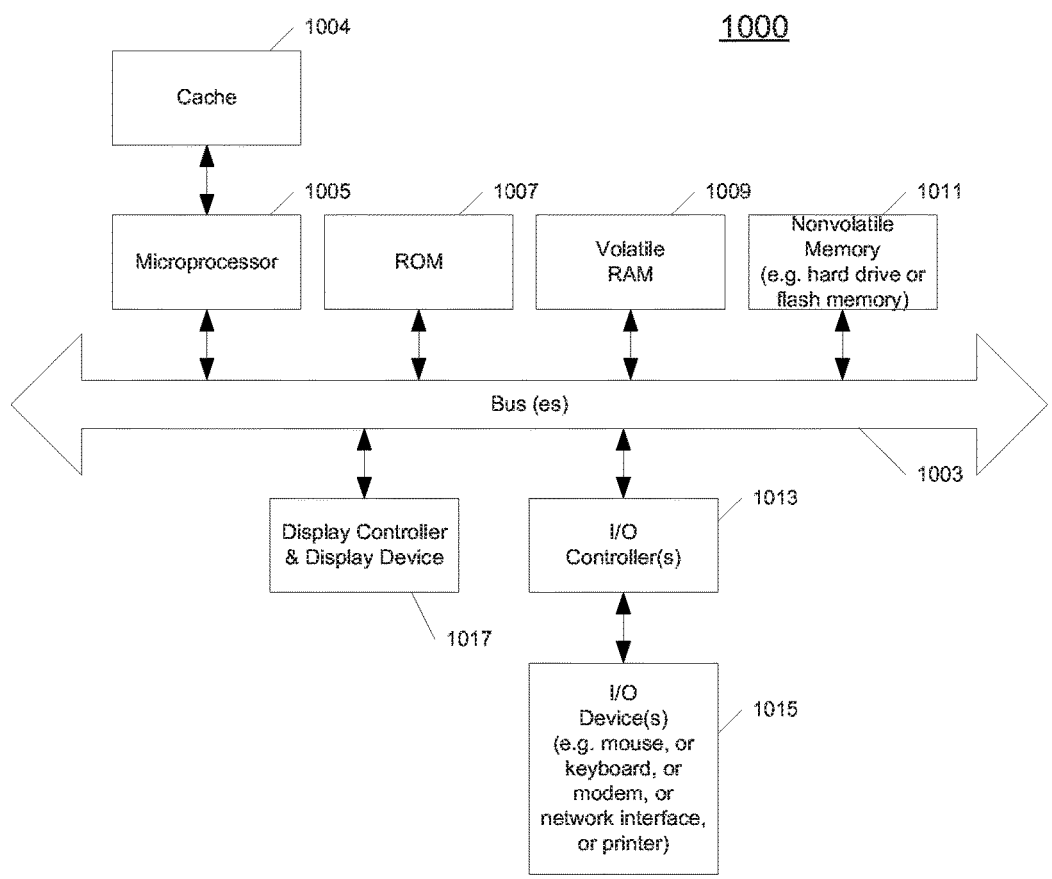
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a network element 100 as shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network date received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintains data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
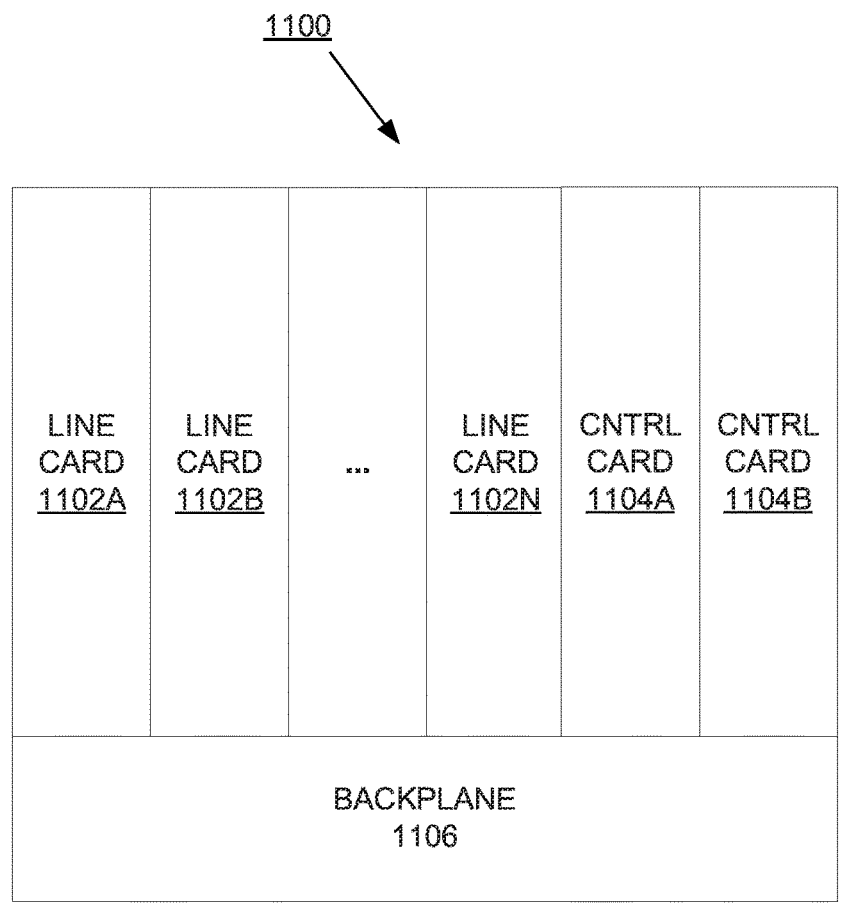
FIG. 11 is a block diagram of one embodiment of an exemplary network element that reads and writes data using a broadcast log.

FIG. 11 is a block diagram of one embodiment of an exemplary network element 1100 that broadcasts data using a broadcast log. In FIG. 11, the backplane 1106 couples to the line cards 1102A-N and controller cards 1104A-B. While in one embodiment, the controller cards 1104A-B control the processing of the traffic by the line cards 1102A-N, in alternate embodiments, the controller cards 1104A-B, perform the same and/or different functions (e.g., broadcasting data using a broadcast log and reading data from the broadcast log, etc.). In one embodiment, the line cards 1102A-N process and forward traffic according to the network policies received from controller cards the 1104A-B. In one embodiment, the controller cards 1104A-B broadcast data using a broadcast log and reads data from the broadcast log as described in FIGS. 3 and 6. In this embodiment, one or both of the controller cards 1104A-B include a CPU to broadcast data using a broadcast log and read data from the broadcast log, such as the CPU 108 as described in FIG. 1 above. In another embodiment, the line cards 1102A-N read and write data to the broadcast log as described in FIGS. 4 and 5. In this embodiment, one, some, or all of the line cards 1102A-N include a co-processor to read and write data to the broadcast log as described, such as the co-processor 114A as described in FIG. 1 above. It should be understood that the architecture of the network element 1100 illustrated in FIG. 11 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "receiving," "determining," "writing," "forwarding," "transmitting," "sending," "reading," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processors to perform a method to handle a hot insertion of a hardware forwarding engine into a network element, the method comprising:
    detecting the hot insertion of the hardware forwarding engine into the network element;
    and in response to detecting,
    determining a class for the hardware forwarding engine, wherein the class of hardware forwarding engine indicates a set of hardware forwarding engines that can be managed by the same sequence of operations in a broadcast log,
    copying accumulated configuration data from a hardware shadow of the network element to a hardware table of the hardware forwarding engine based on at least the class of the hardware forwarding engine,
    and forwarding network data with the hardware forwarding engine using the accumulated configuration data.

2. The non-transitory machine-readable medium of claim 1, wherein the hardware shadow is a summarized state that the hardware forwarding engine would be in after applying entries from the broadcast log maintained by the network element.

3. The non-transitory machine-readable medium of claim 2, wherein the broadcast log is a log that is used to store configuration data for transfer between a central processing unit and one or more co-processors.

4. The non-transitory machine-readable medium of claim 2, further comprising:
    reading subsequent configuration data from the broadcast log using a co-processor associated with the hardware forwarding engine.

5. The non-transitory machine-readable medium of claim 2, wherein the co-processor reads the subsequent configuration data from the broadcast log via a direct memory access.

6. The non-transitory machine-readable medium of claim 1, wherein the configuration data is selected from the group consisting of forwarding data, security data, and quality of service data.

7. A method to handle a hot insertion of a hardware forwarding engine into a network element, the method comprising:
    detecting the hot insertion of the hardware forwarding engine into the network element;
    and in response to the detecting,
    determining a class for the hardware forwarding engine, wherein the class of hardware forwarding engine indicates a set of hardware forwarding engines that can be managed by the same sequence of operations in a broadcast log,
    copying accumulated configuration data from a hardware shadow of the network element to a hardware table of the hardware forwarding engine based on at least the class of the hardware forwarding engine, and forwarding network data with the hardware forwarding engine using the accumulated configuration data.

8. The method of claim 7, wherein the hardware shadow is a summarized state that the hardware forwarding engine would be in after applying entries from the broadcast log maintained by the network element.

9. The method of claim 8, wherein the broadcast log is a log that is used to store configuration data for transfer between a central processing unit and one or more co-processors.

10. The method of claim 8, further comprising:
    reading subsequent configuration data from the broadcast log using a co-processor associated with the hardware forwarding engine.

11. The method of claim 8, wherein the co-processor reads the subsequent configuration data from the broadcast log via a direct memory access.

12. The method of claim 7, wherein the configuration data is selected from the group consisting of forwarding data, security data, and quality of service data.

13. A network element to handle a hot insertion of a hardware forwarding engine into the network element, the network element comprising:
    a processor;
    the hardware forwarding engine that is hot inserted into the network element and coupled to the processing unit;
    memory coupled to the processing unit;
    and a process executed from the memory by the processor cause the processor to detect the hot insertion of the hardware forwarding engine into the network element and, in response to the detecting, determine a class for the hardware forwarding engine, copy accumulated configuration data from a hardware shadow of the network element to a hardware table of the hardware forwarding engine based on at least a class of the hardware forwarding engine, and forward network data with the hardware forwarding engine using the accumulated configuration data, wherein the class of hardware forwarding engine indicates a set of hardware forwarding engines that can be managed by the same sequence of operation is a broadcast log.

14. The network element of claim 13, wherein the hardware shadow is a summarized state that the hardware forwarding engine would be in after applying entries from the broadcast log maintained by the network element.

15. The network element of claim 13, wherein the broadcast log is a log to that is used to store configuration data for transfer between a central processing unit and one or more co-processors.

16. The network element of claim 13, wherein a co-processor reads the subsequent configuration data from the broadcast log via a direct memory access.

* * * * *